United States Patent [19]
Lee

[11] Patent Number: 5,162,621
[45] Date of Patent: Nov. 10, 1992

[54] INTERNAL SIDEBRANCH RESONATOR

[75] Inventor: Carlos Lee, Chatham, Canada

[73] Assignee: Siemens Automotive Limited, Chatham, Canada

[21] Appl. No.: 598,503

[22] Filed: Oct. 16, 1990

[51] Int. Cl.⁵ .............................................. F02N 35/00
[52] U.S. Cl. .................................... 181/229; 181/264; 181/266
[58] Field of Search ............... 181/212, 227, 228, 229, 181/250, 255, 266, 272, 273, 276, 264

[56] References Cited

U.S. PATENT DOCUMENTS

| | | | |
|---|---|---|---|
| 2,056,608 | 10/1936 | Jack | 181/250 |
| 2,297,046 | 9/1942 | Bourne | 181/250 |
| 4,263,982 | 4/1981 | Feuling | 181/264 X |
| 4,381,832 | 5/1983 | Rauch | 181/266 |
| 4,501,341 | 2/1985 | Jones | 181/250 |
| 4,693,339 | 9/1987 | Beale et al. | 181/255 |
| 4,782,912 | 11/1988 | Wandless | 181/229 |
| 4,790,864 | 12/1988 | Kostun | 181/229 X |
| 4,936,413 | 6/1990 | Lee | 181/264 |
| 5,025,889 | 6/1991 | Lockwood et al. | 181/250 |

FOREIGN PATENT DOCUMENTS

| | | |
|---|---|---|
| 700164 | 2/1931 | France . |
| 678344 | 9/1952 | World Int. Prop. O. . |
| 681937 | 10/1952 | World Int. Prop. O. . |
| 988793 | 4/1965 | World Int. Prop. O. . |

Primary Examiner—Michael L. Gellner
Assistant Examiner—Khanh Dang
Attorney, Agent, or Firm—George L. Boller; Russel C. Wells

[57] ABSTRACT

A Helmholtz resonator is disposed interiorly of a gas-carrying conduit to attenuate noise passing through the conduit. The Helmholtz resonator encloses a volume that is communicated to the gas flow by a through hole in the wall of the enclosure. The conduit comprises two parts that telescopically snap together to capture the Helmholtz resonator.

6 Claims, 4 Drawing Sheets

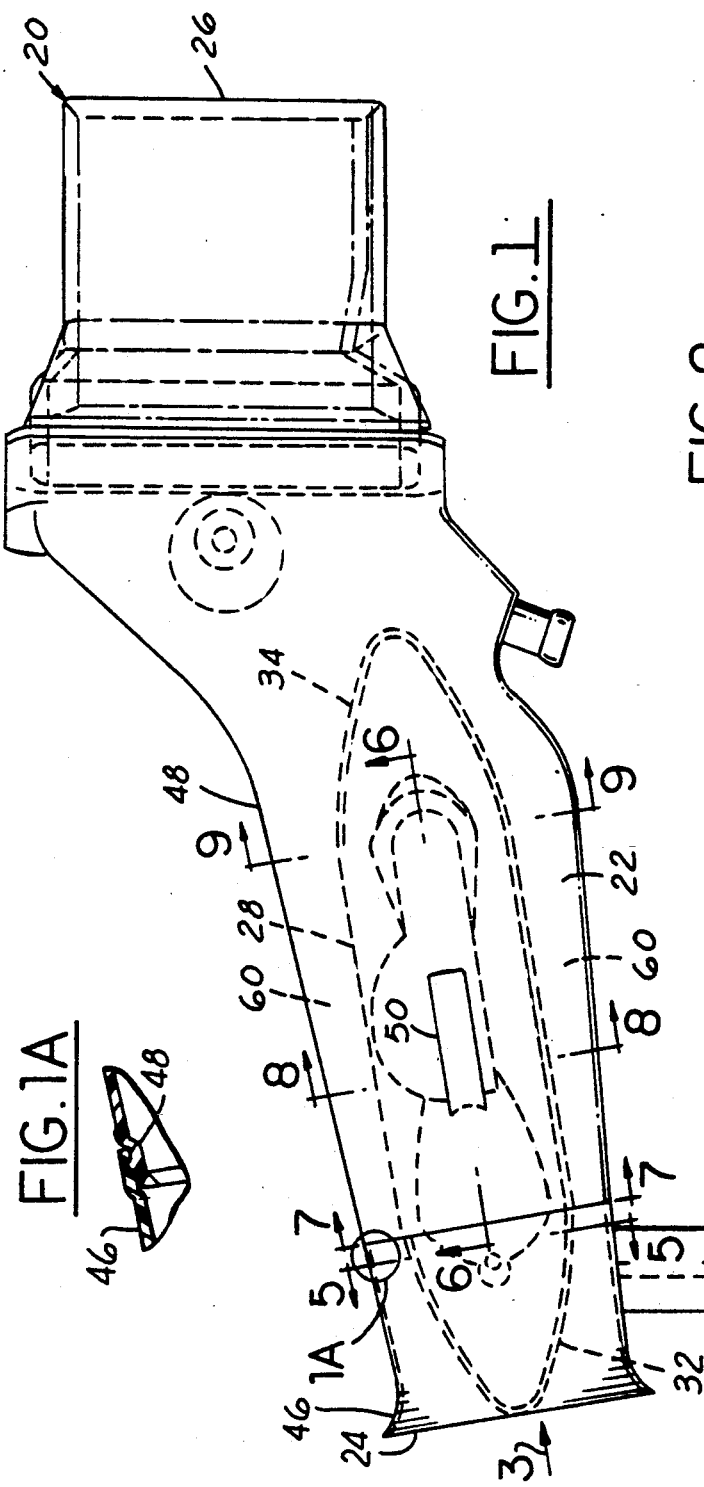
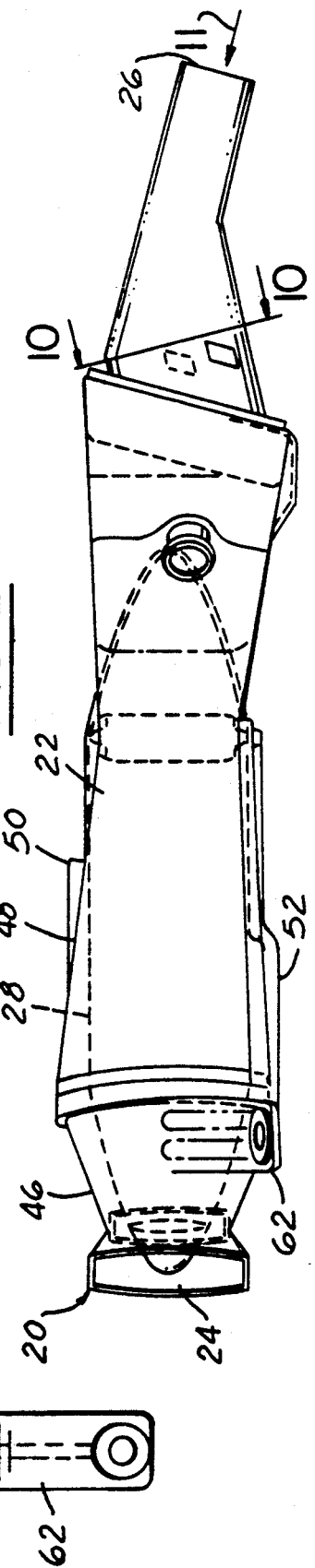

INTERNAL SIDEBRANCH RESONATOR

FIELD OF THE INVENTION

A resonator for the attenuation of noise that propagates through a conduit conveying a gaseous fluid.

BACKGROUND AND SUMMARY OF THE INVENTION

A conduit that conveys a gaseous fluid may also provide a path for the propagation of objectionable noise. Examples of situations where this occurs include: the air intake and exhaust gas outlet of an internal combustion engine; ventilation and air conditioning ducts; and compressor intakes. Objectionable noise can be attenuated by placing a Helmholtz resonator in association with the conduit. The resonator is designed in accordance with a known formula to attenuate noise at and adjacent a particular frequency.

Known implementations of a Helmholtz resonator comprise the resonator being disposed exterior to the conduit and the resonator's interior chamber space being communicated by an aperture of appropriate dimensions to the conduit.

Insofar as the inventor is aware, the state of the art has failed to recognize the possibility of successfully implementing a Helmholtz resonator internally of the conduit. The broadest aspect of the invention relates to such a possibility.

A Helmholtz resonator that is disposed with the conduit offers important space savings over an external Helmholtz resonator implementation. Where available space imposes a constraint on the successful incorporation of a Helmholtz resonator in a gaseous-fluid-conveying conduit, the invention provides a solution for noise attenuation that can accommodate the constraint. For instance, the implementation of a Helmholtz resonator in the induction air system of an automobile engine may be hampered by the availability of only a limited space in the automobile's engine compartment. With the invention, it becomes possible in many instances for such an implementation to be made.

Moreover, the invention comprises ancillary aspects which facilitate the fabrication of the structure involved and the assembly, installation, and performance thereof. These aspects include the shape of the resonator itself and the means by which the resonator is supported within the conduit.

Further features, advantages, and benefits of the invention will be appreciated from the ensuing description which is accompanied by drawings. The drawings disclose a presently preferred embodiment of the invention in accordance with the best mode contemplated at the present time in carrying out the invention.

BRIEF DESCRIPTION OF THE DRAWINGS

FIG. 1 is a longitudinal plan view of an embodiment of internal sidebranch resonator comprising a conduit and a Helmholtz resonator according to the invention.

FIG. 1A is a fragmentary enlarged sectional view in circle 1A of FIG. 1.

FIG. 2 is a front elevational view of FIG. 1.

DESCRIPTION OF THE PREFERRED EMBODIMENT

FIGS. 1 and 2 present the general organization and arrangement of an internal sidebranch resonator 20 embodying the inventive principles. It comprises an elongate walled conduit 22 having openings 24, 26 at opposite lengthwise ends and an elongate walled enclosure 28 disposed internally of, and in general parallelism with, conduit 22. Both conduit 22 and enclosure 28 are fabricated by conventional manufacturing technology using suitable plastic materials. This exemplary embodiment is intended for use in the air induction system of an internal combustion engine that powers an automotive vehicle such as a truck or car.

Figure 3:
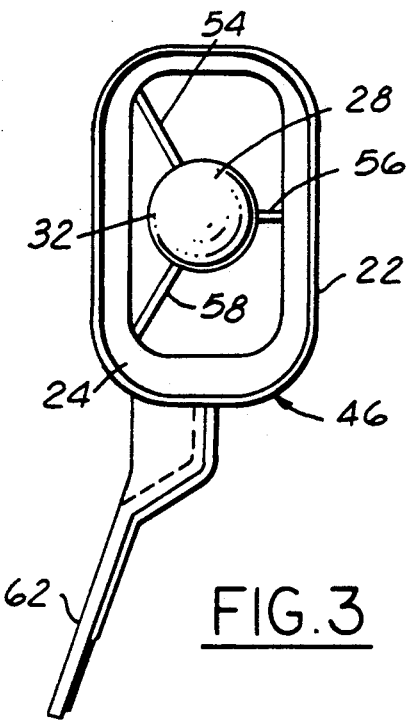
FIG. 3 is an end view looking in the direction of arrow 3.
Figure 4:
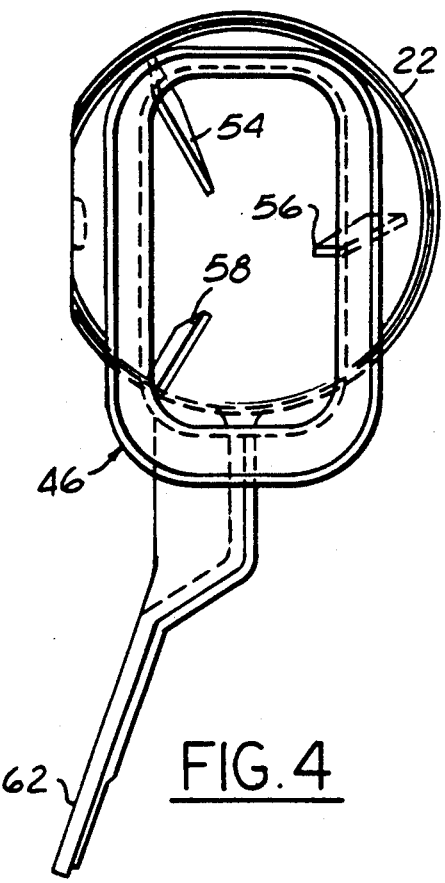
FIG. 4 is an enlarged view in approximately the same direction as that of FIG. 3, but with the resonator omitted.
Figure 5:
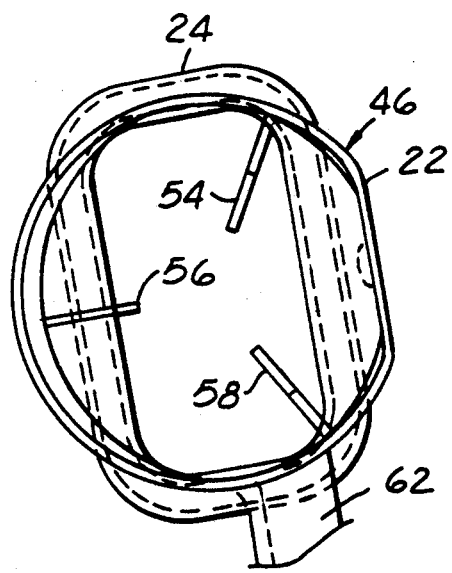
FIG. 5 is a fragmentary view taken in the opposite direction from the view of FIG. 4 and corresponds approximately to an enlarged view taken along arrows 5—5 in FIG. 1 the resonator being omitted.
Figure 6:
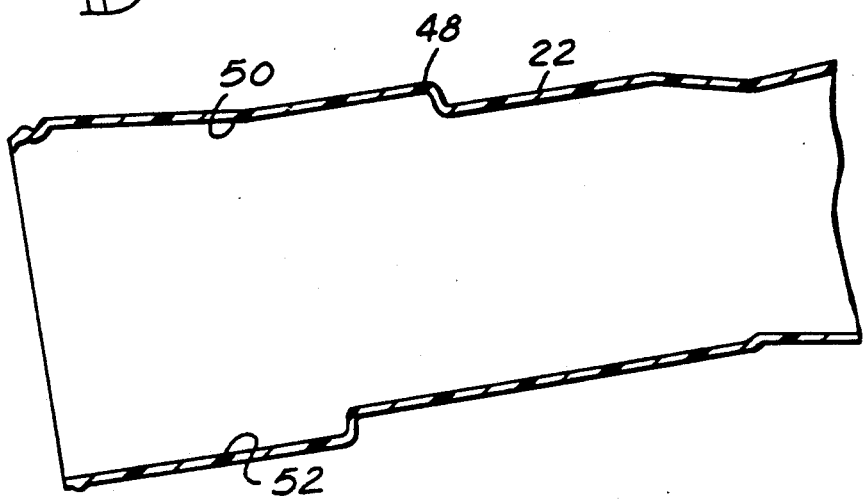
FIG. 6 is an enlarged fragmentary sectional view taken along arrows 6—6 in FIG. 1.
Figure 7:
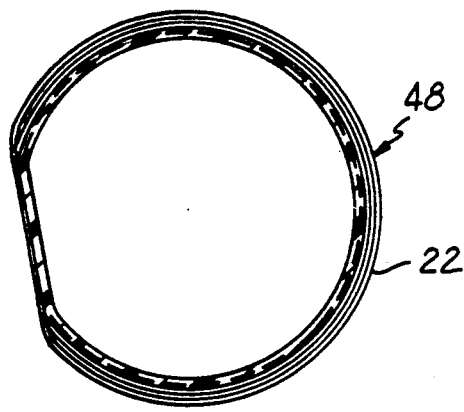
FIG. 7 is an enlarged view taken along arrows 7—7 in FIG. 1 the resonator being omitted.
Figure 8:
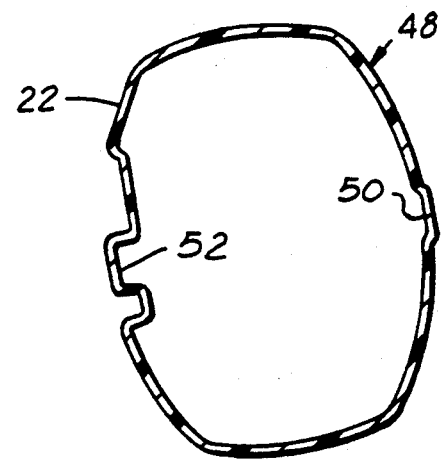
FIG. 8 is an enlarged sectional view taken along arrows 8—8 in FIG. 1.
Figure 9:
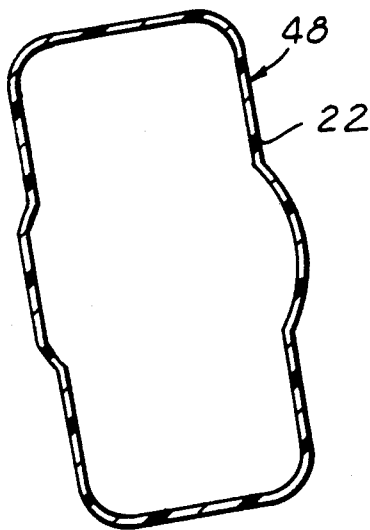
FIG. 9 is an enlarged sectional view taken along arrows 9—9 in FIG. 1 the resonator being omitted.
Figure 10:
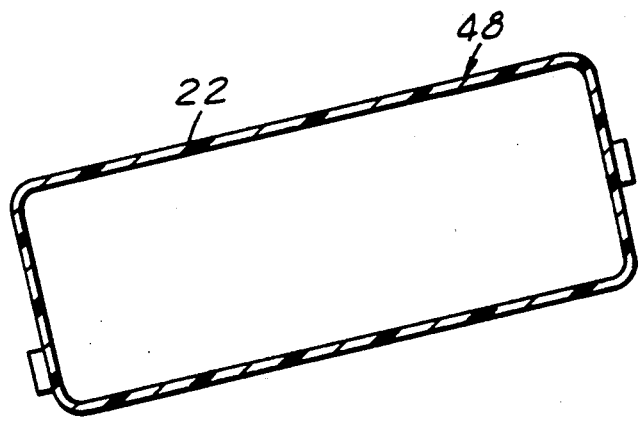
FIG. 10 is an enlarged sectional view taken along arrows 10—10 in FIG. 2.
Figure 11:
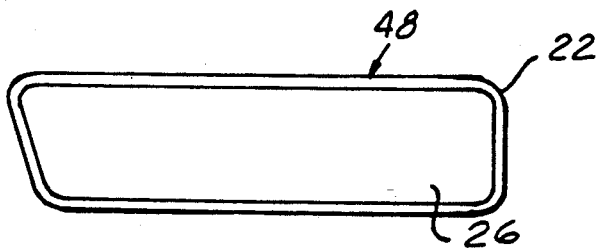
FIG. 11 is an enlarged view in the direction of arrow 11 in FIG. 2 the resonator being omitted.
Figure 12:
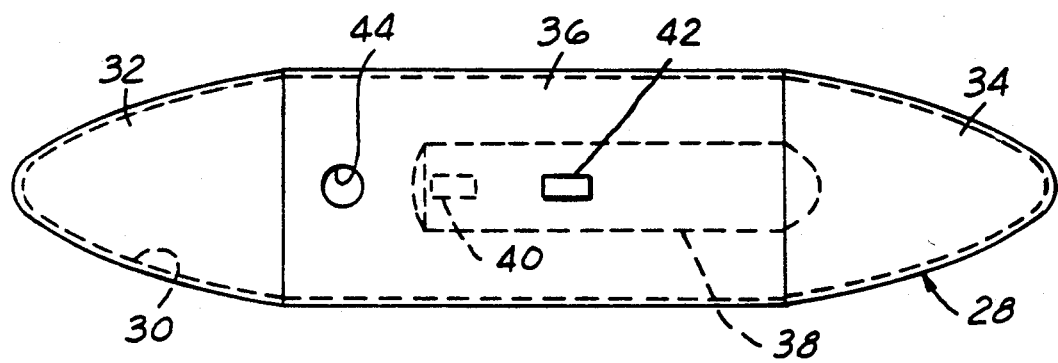
FIG. 12 is an enlarged plan view of the Helmholtz resonator used in the internal sidebranch resonator of FIG. 1.
Figure 13:
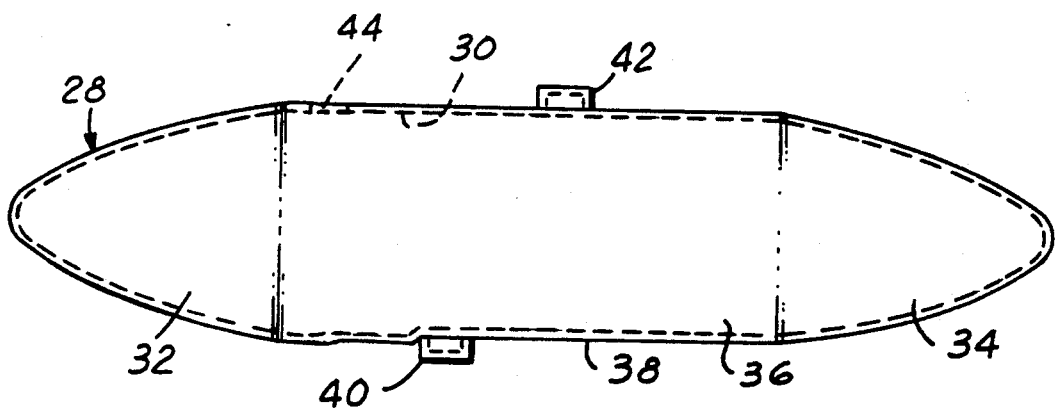
FIG. 13 is a front elevational view of FIG. 12.

As can be seen in greater detail in FIGS. 12 and 13, enclosure 28 is a Helmholtz resonator comprising an enclosed volume 30 whose opposite lengthwise ends are bounded by ogives 32, 34 and whose side is bounded by a cylinder 36. The bottom of cylinder 36 comprises a local flat 38. A small locator 40 protrudes from flat 38 at the left-hand end of the flat as viewed in FIG. 13. Diametrically opposite locator 40, but somewhat to its right, is a second locator 42 protruding from cylinder 36. A circular through-hole 44 is provided in cylinder 36 between locator 42 and ogive 32 to communicate enclosed volume 30 to the flow path through conduit 22 surrounding enclosure 28. The size of volume 30 and the dimensions of through-hole 44 are chosen in accordance with a known formula to cause the Helmholtz resonator to attenuate noise at a particular frequency and at adjacent frequencies.

Conduit 22 comprises plural parts, one of which is designated 46 and the other of which is designated 48. These two parts 46, 48 snap-fit together in a telescopic manner (See FIG. 1A) and coact to capture enclosure 28 in assembly.

Part 48 is formed to have two diametrically opposite channels 50, 52 that run generally lengthwise of conduit 22. Both channels are open at the lengthwise end of part 48 that telescopes with part 46; their opposite lengthwise ends are closed. Channel 50 is somewhat longer than channel 52.

Part 46 comprises three internal fins 54, 56, 58, which project radially inwardly from the inside wall of the conduit. The fins terminate in respective edges that are contoured for fitting onto ogive 32.

Assembly of enclosure 28 to conduit 22 may be accomplished in the following fashion. Before the two parts 46, 48 are telescoped together, enclosure 28 is placed between them with ogive 34 toward opening 26 and ogive 32 toward opening 24. Locators 40, 42 are respectively registered with the open ends of channels 50, 52. As the two parts are moved toward telescopic engagement, the locators travel within their respective channels and ogive 32 nests in fins 54, 56, 58. In final assembly after the two parts have been snapped together, the two locators are in abutment with the closed ends of their channels, and the three fins engage ogive 32. The result is a sturdy, rattle-free construction for resonator 20. Enclosure 28 is thereby also properly located both axially and circumferentially within conduit 22.

The flow path through the conduit includes a zone 60 that is cooperatively defined by the exterior of enclosure 28 and the interior of conduit 22. Through-hole 44 communicates directly to this zone. The enclosure and conduit are shaped to provide a low-restriction path for the gaseous flow through the conduit.

The resonator also includes an integral mounting bracket 62 for attachment of the resonator within the engine compartment of a vehicle.

The resonator is characterized by efficient use of space and materials to achieve significant noise attenuation without undue flow restriction, and is especially well-suited for use in confined spaces, although it need not necessarily be exclusively used where available space is a problem.

While a presently preferred embodiment of the invention has been illustrated and described, it should be understood that invention may be embodied in other equivalent ways.

What is claimed is:

1. A conduit and an internal sidebranch resonator comprising in combination, an elongate walled conduit having an interior extending along a length of the conduit for conveying a gaseous fluid and through which objectionable noise also propagates, and a sidebranch resonator disposed within the interior of said conduit and comprising an elongate walled chamber which has an exterior, which encloses a chamber space of given volume, and which has a length that is arranged generally parallel to that of said conduit, support means for supporting said chamber within the interior of said conduit such that flow through said conduit is constrained to a zone which is cooperatively defined by the exterior of said chamber and the wall of said conduit, and through-aperture means disposed in the wall of said chamber to place said chamber space in fluid communication with said zone, said given volume and said through-aperture means being correlated with a frequency of the objectionable noise such that said chamber forms a Helmholtz resonator that attenuates the objectionable noise passing through said conduit, wherein said chamber comprises opposite lengthwise ends and ogives at said opposite lengthwise ends.

2. A conduit and an internal sidebranch resonator as set forth in claim 1, wherein said chamber comprises a cylinder between said ogives, and said through-aperture means comprises a circular through-hole in said cylinder.

3. A conduit and an internal sidebranch resonator comprising in combination, an elongate walled conduit having an interior extending along a length of the conduit for conveying a gaseous fluid and through which objectionable noise also propagates, and a sidebranch resonator disposed within the interior of said conduit and comprising an elongate walled chamber which has an exterior, which encloses a chamber space of given volume, and which has a length that is arranged generally parallel to that of said conduit, support means for supporting said chamber within the interior of said conduit such that flow through said conduit is constrained to a zone which is cooperatively defined by the exterior of said chamber and the wall of said conduit, and through-aperture means disposed in the wall of said chamber to place said chamber space in fluid communication with said zone, said given volume and said through-aperture means being correlated with a frequency of the objectionable noise such that said chamber forms a Helmholtz resonator that attenuates the objectionable noise passing through said conduit, wherein said support means comprises supporting means integrally formed with the wall of said conduit that engages supported means integrally formed with the wall of said chamber, and wherein said chamber comprises opposite lengthwise ends and an ogive at one of said lengthwise ends, said supporting means comprises plural spaced apart formations in the wall of said conduit, and certain ones of said formations comprise several fins directed inwardly from the wall of said conduit and having distal edges abutting said ogive.

4. A conduit and an internal sidebranch resonator as set forth in claim 3 wherein said conduit comprises two parts that fit together end-to-end, said fins being in a first of said two parts, certain others of said formations being in a second of said two parts.

5. A conduit and an internal sidebranch resonator as set forth in claim 4 wherein said conduit has an exterior, and one of said two parts comprises an integral mounting bracket on the exterior of the conduit providing for the mounting of said conduit.

6. A conduit and an internal sidebranch resonator as set forth in claim 5 wherein said one part is said first part.

* * * * *